United States Patent
Nagarajan et al.

(10) Patent No.: US 12,468,535 B2
(45) Date of Patent: *Nov. 11, 2025

(54) COOPERATIVE INSTRUCTION PREFETCH ON MULTICORE SYSTEM

(71) Applicant: Google LLC, Mountain View, CA (US)

(72) Inventors: Rahul Nagarajan, San Jose, CA (US); Christopher Leary, Sunnyvale, CA (US); Thejasvi Magudilu Vijayaraj, Santa Clara, CA (US); Thomas James Norrie, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,866

(22) Filed: Mar. 5, 2024

(65) Prior Publication Data
US 2024/0211264 A1   Jun. 27, 2024

Related U.S. Application Data

(63) Continuation of application No. 17/972,681, filed on Oct. 25, 2022, now Pat. No. 11,972,263.

(60) Provisional application No. 63/281,960, filed on Nov. 22, 2021.

(51) Int. Cl.
*G06F 9/38* (2018.01)

(52) U.S. Cl.
CPC .......... *G06F 9/3802* (2013.01); *G06F 9/3887* (2013.01)

(58) Field of Classification Search
None
See application file for complete search history.

(56) References Cited

U.S. PATENT DOCUMENTS

| | | | |
|---|---|---|---|
| 6,704,860 | B1 | 3/2004 | Moore |
| 7,206,922 | B1 * | 4/2007 | Steiss ................ G06F 9/3891 712/216 |
| 7,248,266 | B2 | 7/2007 | Tuomi |
| 7,249,202 | B2 | 7/2007 | Simon et al. |
| 7,461,210 | B1 | 12/2008 | Wentzlaff et al. |
| 7,613,886 | B2 | 11/2009 | Yamazaki |
| 7,636,835 | B1 | 12/2009 | Ramey et al. |

(Continued)

FOREIGN PATENT DOCUMENTS

| | | |
|---|---|---|
| JP | 2018521427 A | 8/2018 |
| JP | 2021177366 A | 11/2021 |

(Continued)

OTHER PUBLICATIONS

Yang, L et al., Optimal Application Mapping and Scheduling for Network-on-Chips with Computation in STT-RAM Based Router. 2019, IEEE, pp. 1174-1189. (Year: 2019).*

Paul, S et al., Dynamic task allocation and scheduling with contention-awareness for Network-on-Chip based multicore systems, Jan. 2021, Elsevier, 16 pages. (Year: 2021).*

(Continued)

*Primary Examiner* — Eric Coleman
(74) *Attorney, Agent, or Firm* — Lerner David LLP (57) ABSTRACT

Aspects of the disclosure are directed to methods, systems, and apparatuses using an instruction prefetch pipeline architecture that provides good performance without the complexity of a full cache coherent solution deployed in conventional CPUs. The architecture can include components which can be used to construct an instruction prefetch pipeline, including instruction memory (TiMem), instruction buffer (iBuf), a prefetch unit, and an instruction router.

18 Claims, 6 Drawing Sheets

(56) References Cited

U.S. PATENT DOCUMENTS

| | | | |
|---|---|---|---|
| 7,917,701 | B2 | 3/2011 | Charra et al. |
| 9,086,872 | B2 | 7/2015 | Hargil et al. |
| 9,323,672 | B2 | 4/2016 | Kim et al. |
| 9,628,146 | B2 | 4/2017 | Van Nieuwenhuyze et al. |
| 9,851,917 | B2 | 12/2017 | Park et al. |
| 11,113,233 | B1* | 9/2021 | Volpe .................. G06F 15/8046 |
| 11,182,110 | B1* | 11/2021 | Ansari ....................... G06F 5/06 |
| 11,210,760 | B2 | 12/2021 | Nurvitadhi et al. |
| 11,340,792 | B2 | 5/2022 | Danilov et al. |
| 11,360,934 | B1* | 6/2022 | Abts ....................... G06N 3/063 |
| 2004/0133765 | A1* | 7/2004 | Tanaka .................. G06F 9/3887 712/E9.035 |
| 2007/0198901 | A1 | 8/2007 | Ramchandran et al. |
| 2012/0159130 | A1 | 6/2012 | Smelyanskiy et al. |
| 2012/0303932 | A1* | 11/2012 | Farabet .................. G06N 3/045 712/30 |
| 2013/0151482 | A1 | 6/2013 | Tofano |
| 2017/0004089 | A1 | 1/2017 | Clemons et al. |
| 2017/0351516 | A1 | 12/2017 | Mekkat et al. |
| 2018/0067899 | A1 | 3/2018 | Rub |
| 2018/0081690 | A1 | 3/2018 | Krishna et al. |
| 2018/0109449 | A1 | 4/2018 | Sebexen et al. |
| 2018/0217836 | A1 | 8/2018 | Johnson |
| 2018/0285233 | A1 | 10/2018 | Norrie et al. |
| 2018/0322387 | A1 | 11/2018 | Sridharan et al. |
| 2019/0004814 | A1 | 1/2019 | Chen et al. |
| 2019/0050717 | A1 | 2/2019 | Temam et al. |
| 2019/0121784 | A1 | 4/2019 | Wilkinson et al. |
| 2019/0303311 | A1 | 10/2019 | Bilski et al. |
| 2019/0340722 | A1 | 11/2019 | Aas et al. |
| 2020/0120154 | A1 | 4/2020 | Ren et al. |
| 2020/0183738 | A1 | 6/2020 | Champigny |
| 2020/0192742 | A1* | 6/2020 | Boettcher ........... G06F 11/0721 |
| 2020/0293488 | A1 | 9/2020 | Ray et al. |
| 2020/0310797 | A1* | 10/2020 | Corbal .................. G06F 9/3005 |
| 2021/0081691 | A1 | 3/2021 | Chen et al. |
| 2021/0109761 | A1 | 4/2021 | Wang et al. |
| 2021/0194793 | A1 | 6/2021 | Huse |
| 2021/0303481 | A1 | 9/2021 | Ray et al. |
| 2021/0326067 | A1 | 10/2021 | Li |
| 2022/0012060 | A1* | 1/2022 | Fok ..................... H03M 7/6023 |
| 2023/0229524 | A1 | 7/2023 | Dearth et al. |

FOREIGN PATENT DOCUMENTS

| | | | |
|---|---|---|---|
| JP | 2021532430 | A | 11/2021 |
| WO | 9707451 | A2 | 2/1997 |
| WO | 2006106342 | A2 | 10/2006 |

OTHER PUBLICATIONS

Deb, D et al., ECAP: energy-efficient caching for prefetch blocks in tiled chip multiprocessor, 2019, The Institution of Engineering and Technology, pp. 417-428. (Year: 2019).*

Chhugan et al., "Efficient Implementation of Sorting on Multi-Core SIMD CPU Architecture", PVLDB '08, Aug. 23-28, 2008, Auckland, New Zealand, 12 pages.

Yavits et al., "Sparse Matrix Multiplication on an Associative Processor", retrieved from the Internet on Nov. 19, 2021 <https://arxiv.org/ftp/arxiv/papers/1705/1705.07282.pdf>, 10 pages.

Batcher odd-even mergesort, From Wikipedia, the free encyclopedia, retrieved from the Internet on Nov. 19, 2021 <https://en.wikipedia.org/wiki/Batcher_odd%E2%80%93even_mergesort>, 2 pages.

Chole et al. SparseCore: An Accelerator for Structurally Sparse CNNs. 2018. 3 pages. Retrieved from the Internet: <https://mlsys.org/Conferences/doc/2018/72.pdf>.

Fang et al. Active Memory Operations. Proceedings of the International Conference on Supercomputing—Proceedings of ICS07: 21st ACM International Conference on Supercomputing 2007 Association for Computing Machinery US, ACM, 2 Penn Plaza, Suite 701 New York, NY 10121-0701 USA, Jun. 17, 2007 (Jun. 17, 2007), pp. 232-241, DOI: 10.1145/1274971.1275004.

International Search Report and Written Opinion for International Application No. PCT/US2022/033710 dated Dec. 19, 2022. 17 pages.

Prabhakar et al. Plasticine: A Reconfigurable Architecture for Parallel Patterns. Proceedings of the 44th Annual International Symposium on Computer Architecture, ISCA '17, ACM Press, New York, New York, USA, Jun. 24, 2017 (Jun. 24, 2017), pp. 389-402.

International Search Report and Written Opinion for International Application No. PCT/US2022/049353 dated Feb. 6, 2023. 17 pages.

International Search Report and Written Opinion for International Application No. PCT/US2022/048357 dated Feb. 22, 2023. 16 pages.

International Search Report and Written Opinion for International Application No. PCT/US2022/048919 dated Feb. 22, 2023. 16 pages.

Deb, D., et al., COPE: Reducing Cache Pollution and Network Contention by Inter-tile Coordinated Prefetching in NoC-based MPSoCs, 2020, ACM. pp. 17:1-17:31. (Year: 2020).

Office Action for Japanese Patent Application No. 2023-570416 dated Jan. 7, 2025. 6 pages.

Gaye et al. An Analysis of the Hot Spot Contention and Message Combining on the SSS-MIN. May 25, 1994. D-I vol. J77-D-I, No. 5, pp. 354-363.

Notice of Grant for Japanese Patent Application No. 2023-571623 dated Feb. 4, 2025. 3 pages.

Notice of Grant for Japanese Patent Application No. 2023-572877 dated Feb. 4, 2025. 3 pages.

* cited by examiner

COOPERATIVE INSTRUCTION PREFETCH ON MULTICORE SYSTEM

CROSS-REFERENCE TO RELATED APPLICATIONS

This application is a continuation of U.S. application Ser. No. 17/972,681, filed on Oct. 25, 2022, the disclosure of which is incorporated herein by reference.

BACKGROUND

A single instruction, multiple data (SIMD) processing unit is a type of processing unit for parallel processing of multiple data inputs by performing the same operation on each of the inputs. Operations to be accelerated by SIMD processing units are predetermined at design time of the SIMD processing unit.

Adding an instruction memory to each tile of a cross-lane processing unit (XPU) is expensive, especially if the common use case will be single program multiple data (SPMD) executing different programs simultaneously. A full cache coherent solution, such as deployed in central processing units (CPUs), is too complex and not cost effective for XPUs. It is impractical to provide each core with a private instruction memory that can hold all possible programs, or even a single large program.

The alternative would be to share a common instruction memory (TiMem) across all tiles, but have a small instruction buffer (iBuf) for each compute core and prefetch instructions from TiMem into iBuf when needed. All compute cores share this TiMem and access it concurrently.

SUMMARY

Aspects of the present disclosure include methods, systems, and apparatuses using an instruction prefetch pipeline architecture that provides good performance without the complexity of a full cache coherent solution deployed in CPUs. The architecture can include components which can be used to construct an instruction prefetch pipeline, including instruction memory (TiMem), instruction buffer (iBuf), a prefetch unit, and an instruction router.

An aspect of the disclosure provides for a hardware circuit. The hardware circuit includes a plurality of tiles, where each tile is configured to operate in parallel with other tiles in the plurality of tiles. Each tile of the plurality of tiles includes: a processing core; a prefetch unit; and an instruction buffer. The hardware circuit further includes a plurality of data processing lanes configured to stream respective data from an upstream input to a downstream destination. The hardware circuit also includes a plurality of task instruction memories, where each task instruction memory of the plurality of task instruction memories are arranged in a sequence and coupled to one or more tiles from the plurality of tiles via an instruction router.

In an example, the task instruction memories are arranged in a downstream sequence. In another example, each tile includes a tile access core and the prefetch unit contained within each tile is contained within the tile access core. In yet another example, each tile includes a tile execute core and the prefetch unit contained within each tile is contained within the tile execute core.

In yet another example, the hardware circuit further includes an instruction broadcast bus and an instruction request bus. In yet another example, the instruction broadcast bus contains independent data lanes, where a number of independent data lanes corresponds to a number of task instruction memories. In yet another example, the instruction request bus contains independent data lanes, where a number of independent data lanes corresponds to a number of task instruction memories. In yet another example, instructions received by a task instruction memory are broadcasted to all the tiles linked on the instruction broadcast bus.

In yet another example, the prefetch unit is configured to provide a request to at least one task instruction memory during a prefetch window. In yet another example, the instruction router includes a round robin arbiter configured to arbitrate requests including a prefetch read request. In yet another example, the instruction buffer is configured to store instructions for a tile access core or a tile execute core.

In yet another example, the hardware circuit further includes a task instruction memory access bus, where the task instruction memory access bus includes a read request bus, a read response bus, a write request bus, and a write response bus.

Another aspect of the disclosure provides for a method of providing instructions by a single instruction multiple data (SIMD) processing unit. The method includes: receiving, by one or more processors from a plurality of tiles of the SIMD processing unit, requests for instructions; filtering, by the one or more processors, the requests for instructions to de-duplicate requests for identical instructions to generate a first set of requests; generating, by the one or more processors, a set of instructions responsive to the first set of requests; providing, by the one or more processors from a computing unit to a task instruction memory, the set of instructions; storing, by the one or more processors at the task instruction memory, the set of instructions; and accessing, by the one or more processors by a prefetch unit via an instruction router, an instruction from the set of instructions.

In an example, the receiving occurs in a first processing clock cycle and the providing occurs in a second processing clock cycle. In another example, the first processing clock cycle occurs prior to the second processing clock cycle. In yet another example, each tile of the plurality of tiles comprises a processing core, a prefetch unit, and an instruction buffer.

Yet another aspect of the disclosure provides for a non-transitory computer readable medium for storing instructions that, when executed by one or more processors, cause the one or more processors to perform operations for providing instructions by a single instruction multiple data (SIMD) processing unit. The operations include: receiving, from a plurality of tiles of the SIMD processing unit, requests for instructions; filtering the requests for instructions to de-duplicate requests for identical instructions to generate a first set of requests; generating a set of instructions responsive to the first set of requests; providing, from a computing unit to a task instruction memory of the SIMD processing unit, thea set of instructions; storing, at the task instruction memory, the set of instructions; and accessing, by a prefetch unit via an instruction router, an instruction from the set of instructions.

In an example, the receiving occurs in a first processing clock cycle and the providing occurs in a second processing clock cycle. In another example, the first processing clock cycle occurs prior to the second processing clock cycle. In yet another example, each tile of the plurality of tiles comprises a processing core, a prefetch unit, and an instruction buffer.

DETAILED DESCRIPTION

Generally disclosed herein are implementations for an instruction prefetch pipeline architecture, which can be used in XPUs, that provides good performance without the complexity of a full cache coherent solution deployed in CPUs. An XPU can contain multiple tiles, where each tile can be based on, for example, a decoupled access execute (DAE) architecture having a tile execute core (TEC) and tile access core (TAC). For example, in an XPU with 8 cores, there can be a total of 16 independent cores running in parallel.

Aspects of the disclosed technology provide methods and systems related to creating a prefetch pipeline optimized for single program multiple data (SPMD) aspects of a programming model to reduce the cold cache miss overheads. The prefetch responses from any core are broadcast to all the cores in the XPU. These prefetch responses are committed to the local cache of the core. This allows the other non-requesting cores to get bundles of instructions or data ahead of a time when cores will be available to process the instructions or data, completely avoiding missing process cycles. In addition there can be prefetch request filtering on the arbitration path, which is a logical and/or hardware based pathway to arbitrate between requests, leading to the Timem, which boosts the Timem bandwidth by avoiding redundant request fetches.

Figure 1:
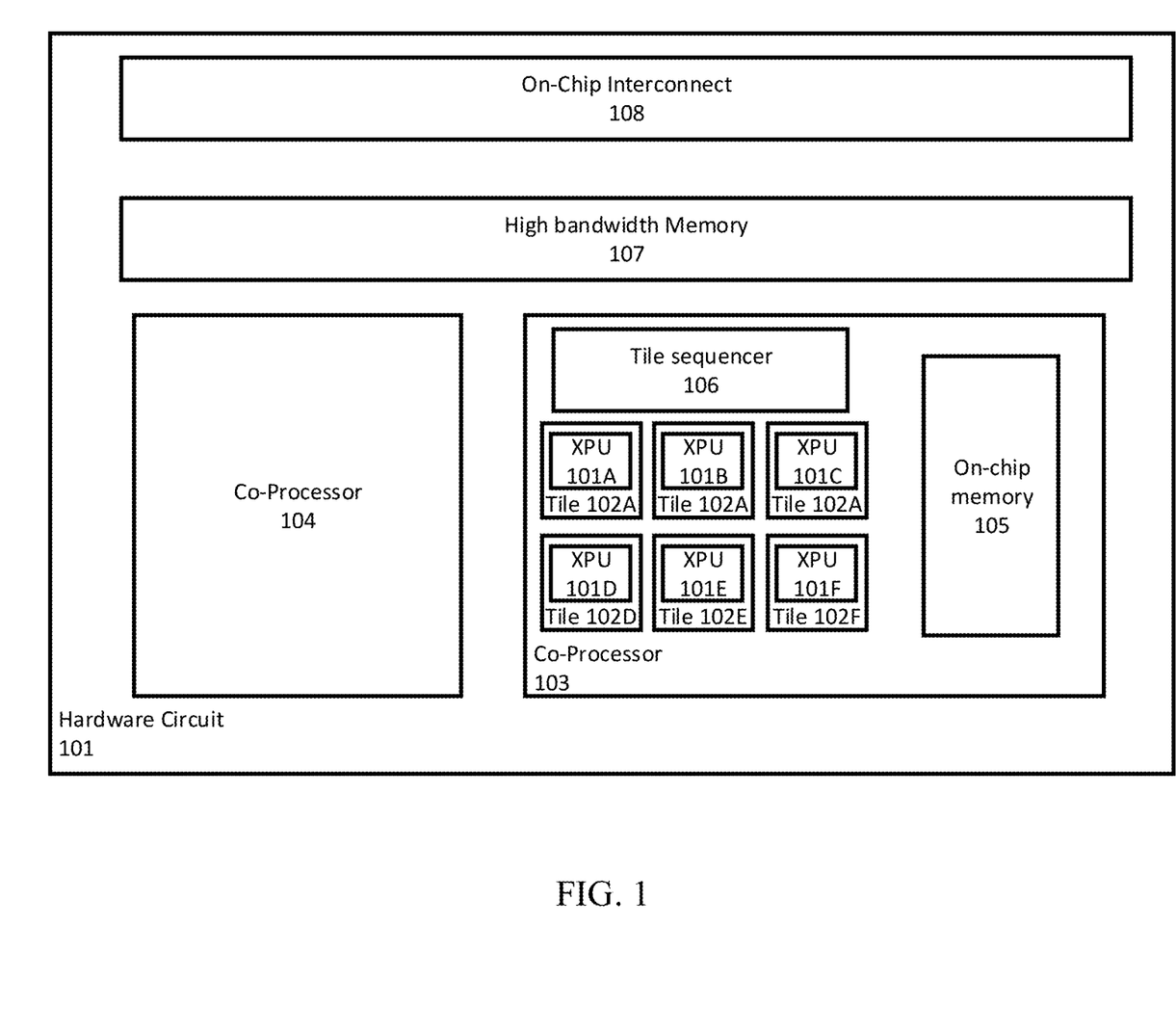
FIG. 1 depicts a block diagram of an example hardware circuit implementing cross-lane processing units (XPUs) according to aspects of the disclosure.

FIG. 1 is a block diagram of a hardware circuit 101 implementing cross-lane processing units (XPUs) 101A-F, according to aspects of the disclosure. The hardware circuit 101 can include a first co-processor 103, a second co-processor 104, high-bandwidth memory 107, and an on-chip interconnect 108. The co-processor 103 can include one or more tiles 102A-F, each tile implementing a respective XPU 101A-F. The first co-processor 103 can include a tile sequencer 106 configured to coordinate input and output data across the tiles 102A-F.

The first co-processor 103 is configured for performing data-dependent operations using the XPUs 102A-F. The XPUs 102A-F are connected to a series of data processing lanes, each lane streaming data through the XPUs 102A-F. The streamed data can be retrieved from the on-chip memory 105, which can be any of a variety of different memory devices, including main memory, cache, or persistent storage, such as solid state or hard disk storage. The streamed data can also be retrieved from the second co-processor 104, the high bandwidth memory 107 servicing one or both of the co-processors 103 and 104, and/or another source of data connected to the hardware circuit 101 through the on-chip interconnect 108.

The second co-processor 104 can be configured for acceleration of certain operations, such as matrix-matrix multiplication, matrix-vector multiplication, etc. In some examples, the second co-processor 104 resides on a different device than the rest of the hardware circuit 101 and communicates data to the hardware circuit through the on-chip interconnect 108. The on-chip interconnect 108 can be a data bus or any form of interconnect according to any of a variety of communication standards, for example PCIe.

An example input to the hardware circuit 101 is a tensor representing input data and/or model parameters of a machine learning model to be executed using the hardware circuit 101. A tensor is a data structure generalizing various other common data structure types of differing dimensions. A tensor can include zero or more elements, which can be of one or more different data types, such as integers, floating-point values, Boolean values, etc. Within each data type, a data type can be parameterized according to a certain level of precision, for example an 8-bit, 16-bit, or 32-bit integer or floating-point value. The dimension of a tensor is referred to as its "rank." A tensor of rank zero is a single element, also called a scalar. A tensor of rank one is also called a vector. A tensor of rank two is also called a matrix. Vectors and matrices can also be referred to as having different ranks. For example, a vector of rank two is equivalent to a matrix. A tensor of a non-zero rank can be described as a collection of tensors one rank lower. For example, a vector of rank one is a collection of scalar values, and a matrix of rank two is a collection of vectors of rank one.

The hardware circuit 101 may at least partially implement a processing pipeline for training a neural network. The pipeline may include generating embeddings for input training examples. An embedding can represent features of an input training example using less data, allowing for more efficient processing. Feature tensors for different input training examples will have different degrees of sparsity, which affect the amount of computational work required to generate a corresponding embedding. The hardware circuit can be configured to receive a tensor of feature values representing a training input example and generate an embedding as a tensor having a lower rank than the feature tensor.

To generate the embeddings, the co-processor 103 is configured to implement a variety of data-dependent operations for efficient sparse data computation on the XPUs 102A-F. These operations include sorting or summing sparse vectors, operations for summarizing the contents of input vectors, and operations for translating sparse matrices from one sparse matrix storage format to another.

Instead of physical predetermined circuits for accelerating the performance of data-dependent operations, the XPUs 102A-F can be configured, for example programmed, to perform a variety of different data-dependent operations. The co-processor 103 allows for generalized support of processing sparse data, while still allowing a complementary co-processor 104 to perform highly efficient and parallelizable operations.

The hardware circuit 101 can be any of a variety of different types of processing units, for example a central processing unit (CPU), a graphics processing unit (GPU), a field programmable gate array (FPGA), or an application-specific integrated circuit (ASIC), such as a tensor processing unit (TPU). The hardware circuit 101 can be implemented on a computing device, which itself may be part of a system of one or more devices, as described herein with reference to FIG. 6.

Figure 2:
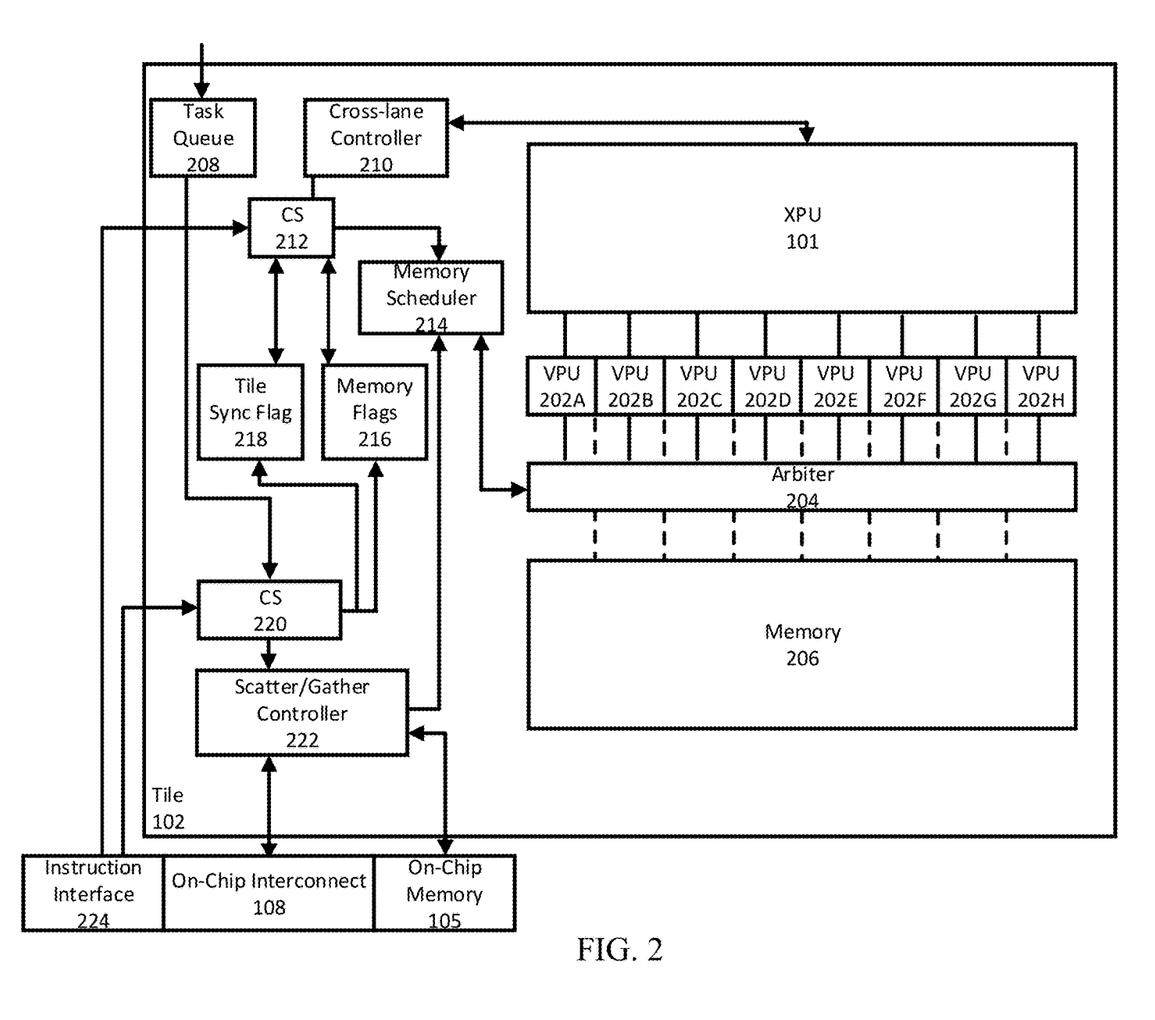
FIG. 2 depicts a block diagram of an example tile implementing an XPU according to aspects of the disclosure.

FIG. 2 is a block diagram of an example tile 102 implementing an XPU 101. The XPU 101 is coupled to a cross-lane controller 210. The cross-lane controller 210 provides a separate thread of control to allow cross-lane instructions on the XPU 101. As described herein, the XPU can receive a first instruction, for example through one or more control signals, which can be converted into one or more second and third instructions and provided to processing cells and crossbars of the XPU 101, respectively, for performing a composed operation specified by the first instruction. Instructions to the XPU 101 can be carried over control signals, in which processing cells and crossbars of the XPU 101 are configured to interpret to perform a corresponding primitive operation. An example instruction can be an opcode of an instruction set architecture (ISA).

The tile 102 can receive data from the on-chip interconnect 108, as well as from the on-chip memory 105 as described with reference to FIG. 1. The XPU can also receive instructions from an instruction interface 224, for example from the tile sequencer 106 through a scalar core 212 or scalar core 220. A scatter/gather controller 222 of the tile 102 can receive incoming data, and control what data is passed in the memory 206 through a memory scheduler 214. The memory scheduler 214 coordinates how data is accessed and retrieved from the memory 206. The memory 206 is private to the tile 102, and not accessible by other components connected to the tile 102, such as other tiles. Arbiter 204 is configured to manage which of VPUs 202A-H access the memory 206, for example on a clock-cycle to clock-cycle basis. The tile 102 can maintain a task queue 208 of tasks to be performed by the tile 102. The tile 102 can also maintain registers of tile synchronization flags 218 and/or memory flags 216 for synchronizing the tile 102 with other tiles of the hardware circuit and the memory 206, respectively.

Figure 3:
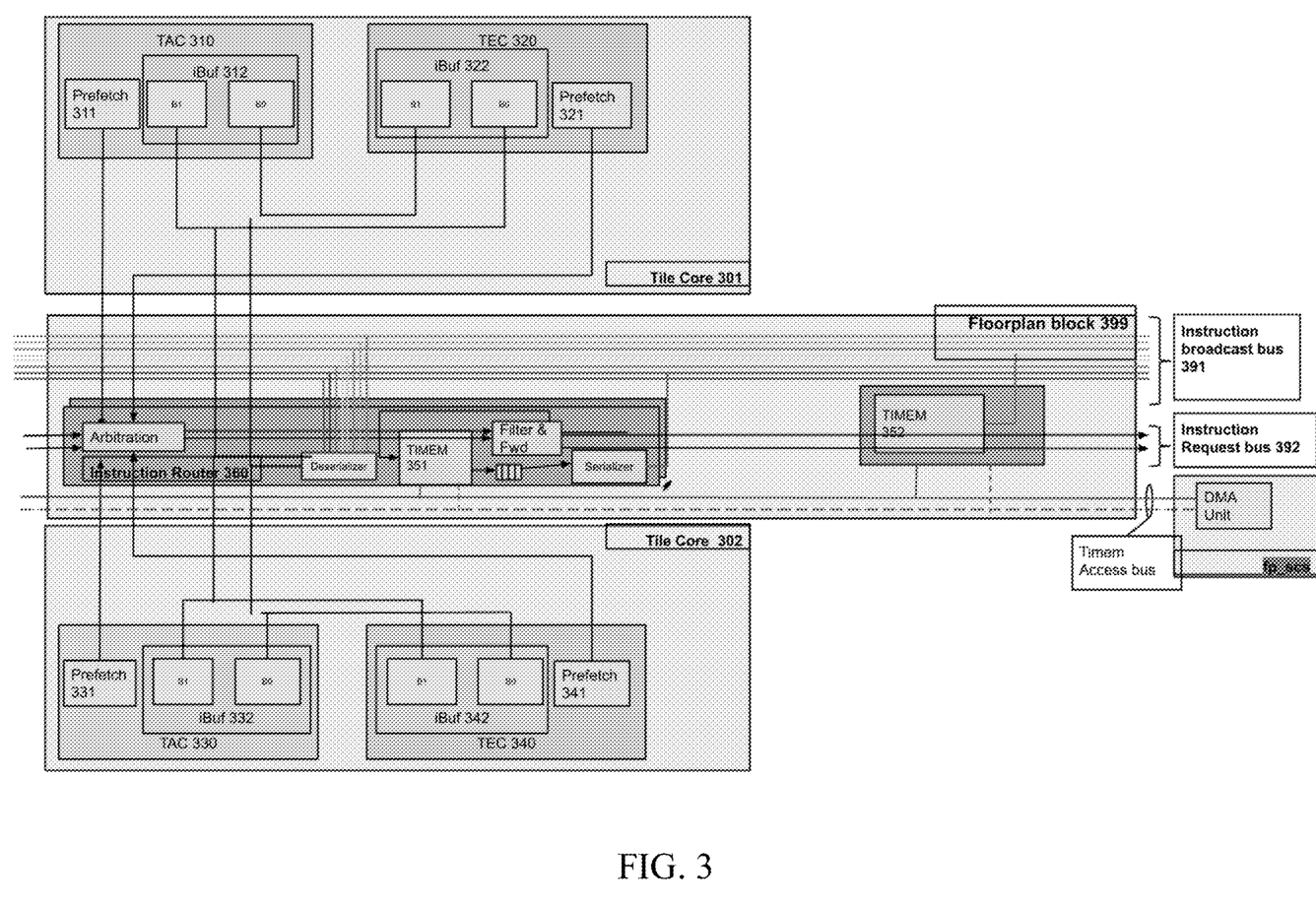
FIG. 3 depicts a block diagram of an example XPU according to aspects of the disclosure.

FIG. 3 illustrates a logical view of connectivity between blocks within an XPU according to aspects of the disclosed technology. Through prefetching instructions, aggregating requests for instructions, filtering, and retaining instructions or references to the memory location closest to a requesting processing unit, instructions can be more quickly provided to processing units or processing cores, increasing the efficiency of the system.

FIG. 3 illustrates aspects of task instruction memory (Timem or Timem bank), instruction buffers (iBuf), prefetch units (prefetch), and instruction routers. Illustrated in FIG. 3 is tile core 301, containing tile access core (TAC) 310 and tile execute core (TEC) 320. TAC 310 can contain a prefetch 311 and iBuf 312. Similarly, TEC 320 can contain prefetch 321 and iBuf 322. Also illustrated in FIG. 3 is tile core 302, which contains TAC 330 and TEC 340, respectively containing prefetch 311 and iBuf 332, and prefetch 341 and iBuf 342.

Further illustrated in FIG. 3 are Timem 351 and 352 and instruction router 360, which can be contained within floorplan block 399. Timem 351 and 352 can locally store instructions for quicker access by each tile core versus the tile core requesting the instructions from a location which is further downstream from the Timem. Also illustrated is an instruction broadcast bus, which can broadcast instruction bundles downstream to floorplan block 399 and to Timem banks therein. Instruction request bus 392 can aggregate requests for instructions from various components before requesting those instructions. Deserializer and serializer can deserialize or serialize instructions being received from instruction broadcast bus 391 or serialize instructions being sent to instruction request bus 392.

A prefetch unit, such as prefetch 311 or prefetch 312, corresponding to a core can make a read request to the Timem starting from a miss program counter (PC) (and the overlay/task ID) until the end of a prefetch window. A prefetch window is a time period which can be selectable by software with a register or other memory area. For example, the prefetch window can be defined in a prefetch_depth variable. Prefetch read requests from other tiles can be forwarded by adjacent floorplan block 399. These forwarded requests can be arbitrated with the prefetch requests made by the prefetch units in an adjacent tile core. For example, tile core 301 and tile core 302 may be adjacent to one another. In some examples, a pair of cores can be assigned to a single instruction request bus or a single instruction broadcast bus.

A number of prefetch instruction request banks can be present in the XPU. In some examples, there can be one bus per Timem bank, which can be arbitrated independently from one another. Independent arbitration of the buses can allow for avoidance of head-of-line blocking across independent banks.

Requests that are sent from a prefetch window can be received at instruction router 360. Instruction router 360 can filter the selected requests to remove duplicates before forwarding to another instruction router or to the target Timem bank. Filtering can potentially increase the instruction request bandwidth if the cores are operating in an SPMD mode.

Instructions read from a Timem bank can be broadcasted to all the tiles on the instruction broadcast bus. For example, there can be as many instruction broadcast buses as Timem banks. In some examples, instructions can be sent as instruction bundles. Instruction groups are composed of instructions contained in bundles. A bundle can be a sequence of instructions that starts on an aligned "boundary." The instruction bundle can be serialized on a corresponding instruction broadcast bus over a fixed number of cycles of the processor or core. In some examples, such as during a "steady-state" operation of the system, the aggregate bandwidth of the instruction broadcast buses can be 2 bundles per cycle. In this manner, instruction broadcast bus 392 is never back-pressured.

The instructions received on the broadcast bus can be deserialized by the instruction router and one instruction is forwarded to each of the Ibuf. At steady state, the system can be required to sustain up to 2 writes from the prefetch interface and 1 read from the instruction fetch interface. The prefetch processes the incoming instruction, and decides if it should be committed to the Ibuf or dropped.

Figure 4:
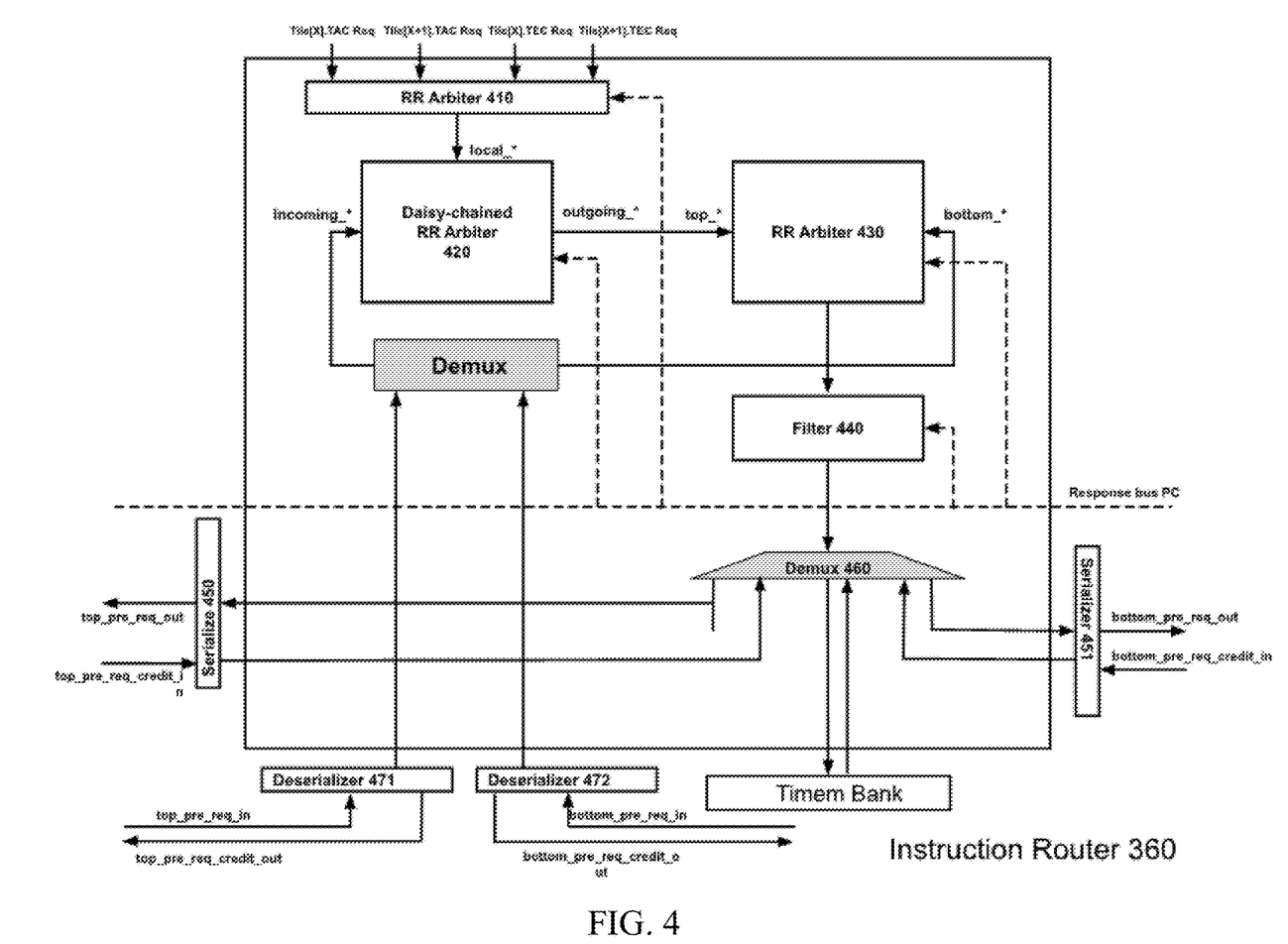
FIG. 4 depicts a block diagram illustrating aspects of an example instruction router according to aspects of the disclosure.

FIG. 4 illustrates additional aspects of instruction router 360. Illustrated in FIG. 4 is round robin (RR) arbiter 410, daisy-chained round robin arbiter 420, round robin arbiter 430, filter 440, serializers 450 and 451, demultiplexers (demux) 460, and deserializers 471 and 472.

Instruction router 360 has an independent read request bus for each Timem bank in the system. The instruction bundles can be throttled at the rate to match the bandwidth of the instruction broadcast bus before being forwarded to an adjacent instruction router. In the description below, it can be assumed that deserialization and serialization can be performed before a request is presented to instruction router 360.

The instruction router 360 can arbitrate across sources depending on the position of the cores relative to a Timem bank. Instruction router 360 can be parameterized to select sources and destinations based on instances instruction router 360 is arbitrating. Demux 460 can be designed according to the number of timebanks or serializers with which it is in communication.

Instruction router 360 can arbitrate across the following example sources: a prefetch read forwarded by an instruction router upstream or above instruction router 360; a prefetch read forwarded by instruction router downstream from instruction router 360; and a prefetch read originated by cores connected to instruction router 360.

The demux can select the top_pre_req or bottom_pre_req to arbitrate with the request originating from the cores connected to the instruction router. This arbitration can use a daisy-chained RR arbitration scheme. Daisy-chained round robin arbiter 420 can grant every "x" cycles to match the bandwidth of the instruction broadcast bus. A request waiting to be arbitrated can be dropped if the PC matches the PC seen on the instruction broadcast bus. This can be considered to be the first level of filtering.

The winner of the daisy chained arbitration can be processed differently based on the position of instruction router 360 relative to a Timem bank. For instance, if Timem bank is below the instruction router, the winner of the daisy chain arbitration can be forwarded to instruction router at the "bottom" after passing through filter 440. If Timem bank is above the instruction router 360, the winner of the daisy chain arbitration is forwarded to instruction router 360 at the top after passing through filter 440.

If Timem bank is within instruction router 360, the winner of the daisy chain arbitration undergoes one more levels of arbitration with the request forwarded by the instruction router at the bottom. In this case, there can be two daisy-chained networks arbitrating to get to the Timem bank. Depending on the position of instruction router 360, the chains may not be balanced. To ensure fair access is provided to the cores on either side of the chain, a modified RR arbiter can be used. Similar to the first level arbitration, any request that matches the PC on the broadcast bus will be dropped here. This can be considered to be a second level of filtering.

The overall winner from above is passed to the filter 440, which compares the incoming request against one of the other outstanding requests. The request is dropped if the request matches any of the outstanding requests. This can be considered to be the third-level of filtering.

Further, programmability of this system can be ensured as the filtering at each point can be enabled/disabled with an individual programmable or software controllable switch.

Referring back to FIG. 3, a Timem access bus can be a bus which connects the system to all the Timem banks, allowing them to read and write instruction bundles to the Timem banks. The Timem access bus can have 4 buses: a read request bus, a read response bus, a write request bus, and a write response bus, as further explained below.

The read request bus can be a daisy-chained bus that can run to the Timem banks. Each Timem bank can forward a request to an adjacent Timem bank if the request is not addressing it. If the request addresses the Timem bank then it is serviced by the Timem bank.

The read response bus can be a daisy-chained bus that can transmit the instruction bundles read from the Timem bank. At each Timem bank there can be a round robin arbitration between the incoming instruction from an adjacent bank and the instruction bundle from the current bank. As the instruction bundles are serialized over "n" cycles, the bus grant is held for "n" cycles.

The write request bus can be a daisy-chained bus that can run to the Timem banks. The write requests can be serialized over 2 cycles for example. Each Timem bank forwards the flits to adjacent banks if the request is not addressing it. If a request addresses the Timem bank, then the request is deserialized by the bank before being written into the Timem bank.

The write response bus can be a daisy-chained bus that relays the write response from the Timem banks. At each Timem bank there is an arbitration between an incoming response and the response from the current bank. A simple round-robin arbitration can be used to allow one of the responses to be granted or provided.

The read and write requests can have a "q" bit tag to encode for a maximum of $2^q$ outstanding read and write requests, which are passed back in the responses by the banks, and can be used by the overall system or a component providing instructions to identify a request corresponding to the responses.

If an end-point is unable to accept a request or a response, the bus can "backpressure," When the bus is unable to transfer instructions or data it contains and a backlog to be sent through the bus builds up. In addition, the bus can be backpressured due to arbitration loss. This can be allowable in the overall system as the Timem accesses are generally low bandwidth accesses.

Figure 5:
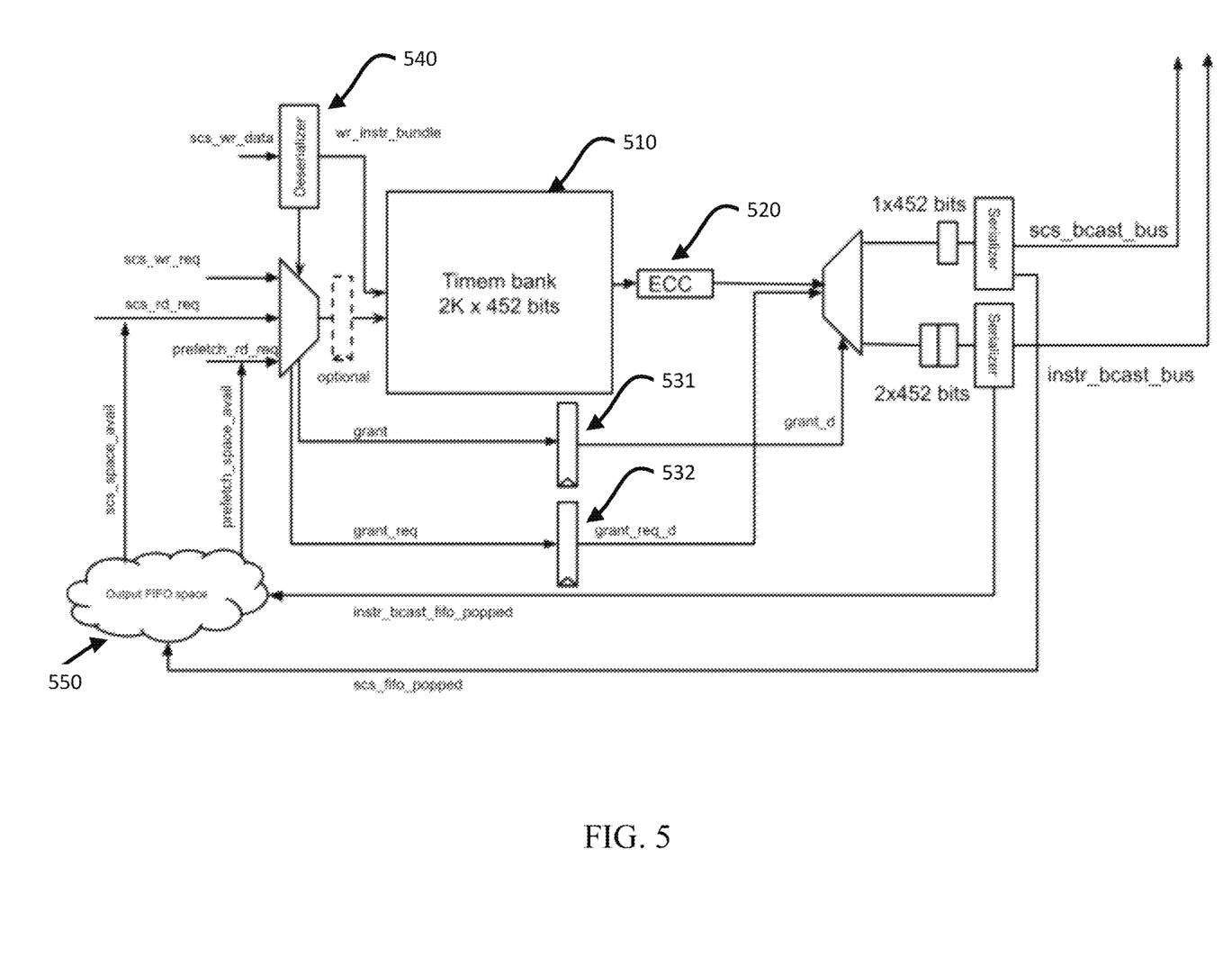
FIG. 5 depicts a block diagram of an example XPU configuration for vector scan operations performed by the XPU according to aspects of the disclosure.

Tile Instruction Memory (Timem) can be shared by the tile cores described in FIG. 3. An example architecture of a Timem bank is provided in FIG. 5. As illustrated in FIG. 5, the bank structure 510 can operate in conjunction with error-correcting code (ECC) memory 520, deserializer 540, multiplexers, demultiplexers, an output first-in first-out memory space 550, and gates 531 and 532.

Timem can hold a set of programs that can be executed by the Tile Access Core (TAC) and Tile Execute Core (TEC). The program counter (PC) in each core is a physical offset into Timem. The Timem is a software managed memory that is exposed to the direct memory access system. Software can use direct memory access to populate the programs in the Timem and use the appropriate PC while issuing the tasks to the SCTs.

The overall tile instruction memory can be sliced into a number of banks which can be distributed within floorplan block 399. Each Timem bank uses a cycle-by-cycle last recently used (LRU) arbitration across any of the following three sources: (1) prefetch read requests from the instruction bus connected to the bank, (2) core write request (originated by direct memory access write or Control Status Register (CSR) indirect write request), and (3) core read request (originated by direct memory access reads or the CSR indirect read requests).

The arbiter input is gated by the availability of output first-in first-out (FIFO) space corresponding to the requestor. This FIFO holds the bundles read by the requestor. In some examples, the instruction prefetch response stored in first-in first-out memory space 550 is popped or reset every x cycles while the read response memory is popped every 2× cycles. In other examples, the depth or size of the FIFO memory can be increased to absorb bursts of information.

Figure 6:
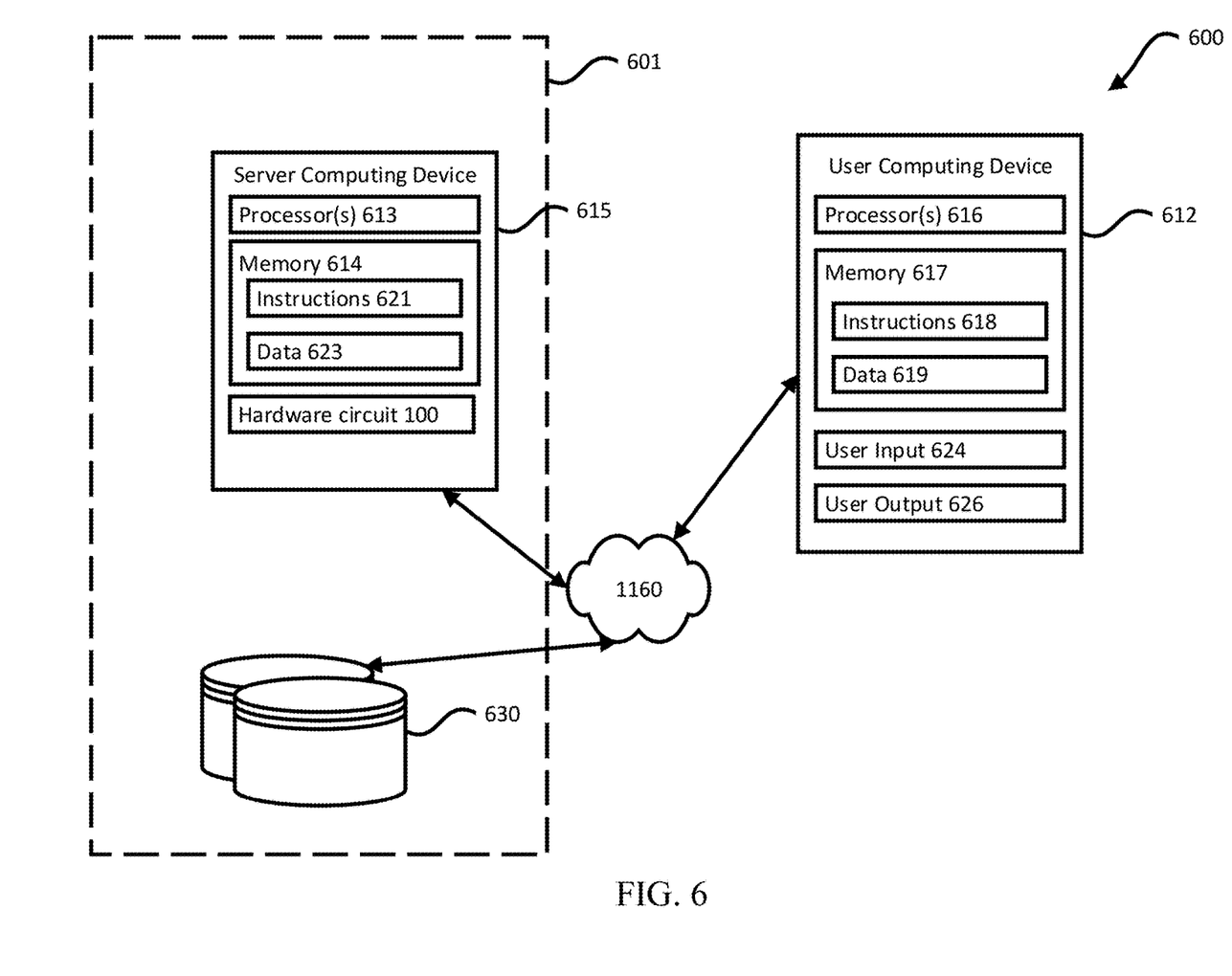
FIG. 6 depicts a block diagram of an example environment for implementing the hardware circuit according to aspects of the disclosure.

FIG. 6 is a block diagram of an example environment 600 for implementing the hardware circuit 101. The hardware circuit 101 can be implemented on a device having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processor(s) 613, including instructions 621 that can be executed by the processor(s) 613. The memory 614 can also include data 623 that can be retrieved, manipulated, or stored by the processor(s) 613. The memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application specific integrated circuits (ASICs), such as tensor processing units (TPUs). The processor(s) 613 can include a co-processor implemented as part of the hardware circuit, as described herein with reference to FIG. 1.

The instructions 621 can include one or more instructions that when executed by the processor(s) 613, causes the one or more processors to perform actions defined by the instructions. The instructions 621 can be stored in object code format for direct processing by the processor(s) 613, or in other formats including interpretable scripts or collections of independent source code modules that are interpreted on demand or compiled in advance. The instructions 621 can include instructions for configuring the XPU of the hardware circuit 101 consistent with aspects of this disclosure. The server computing device 615 and/or the user computing device 612 can implement a compiler or other program for generating and sending instructions to the hardware circuit 101 as control signals for configuring the XPU of the circuit.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing device 55, with one or more processors 516, memory 517, instructions 518, and data 519. The user computing device 612 can also include a user output 526, and a user input 524. The user input 524 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 526. The user output 526 can also be used for displaying an interface between the user computing device 612 and the server computing device 615. The user output 526 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 516 and the memories 614, 517 as being within the computing devices 615, 612, components described in this specification, including the processors 613, 516 and the memories 614, 517 can include multiple processors and memories that can operate in different physical locations and not within the same computing device. For example, some of the instructions 621, 518 and the data 623, 519 can be stored on a removable SD card and others within a read-only computer chip. Some or all of the instructions and data can be stored in a location physically remote from, yet still accessible by, the processors 613, 516. Similarly, the processors 613, 516 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services. One or more services can be a machine learning framework or a set of tools for generating neural networks or other machine learning models according to a specified task and training data. The user computing device 612 may receive and transmit data specifying a workload or type of composed operation the XPU of the hardware circuit 101 should be configured to perform. The user computing device 612 can send the instructions directly to the hardware circuit 101 or cause the server computing device 615 to generate and send instructions as control signals to the hardware circuit 101 as described herein.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware and hardware circuits, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

With respect to the use of substantially any plural and/or singular terms herein, for example (with the term "element" being a stand-in for any system, component, data, etc.) "an/the element," "one or more elements," "multiple elements," a "plurality of elements," "at least one element," etc., those having skill in the art can translate from the plural to the singular and/or from the singular to the plural as is appropriate to the context and/or application described. The various singular/plural permutations may be expressly set forth herein, for sake of clarity and without limitation unless expressly indicated.

The invention claimed is:

1. A hardware circuit, comprising:
a plurality of tiles respectively configured to operate in parallel to stream data from an upstream input to a downstream destination; and
a plurality of task instruction memories, each task instruction memory being arranged in a sequence and coupled to the plurality of tiles via an instruction router that determines a sequence for streaming the data and filters requests for instructions to remove duplicate requests.

2. The hardware circuit of claim 1, wherein each tile comprises a tile access core comprising a prefetch unit.

3. The hardware circuit of claim 1, wherein each tile comprises a tile execute core comprising a prefetch unit.

4. The hardware circuit of claim 1, further comprising an instruction broadcast bus comprising a plurality of data processing lanes, the number of data processing lanes corresponding to the number of task instruction memories.

5. The hardware circuit of claim 1, further comprising an instruction request bus comprising a plurality of data processing lanes, the number of data processing lanes corresponding to the number of task instruction memories.

6. The hardware circuit of claim 1, wherein each tile comprises a prefetch unit configured to provide a request to at least one task instruction memory during a prefetch window.

7. The hardware circuit of claim 1, wherein the instruction router comprises a round robin arbiter configured to arbitrate prefetch read requests.

8. The hardware circuit of claim 1, wherein each tile comprises an instruction buffer configured to store instructions for a processing core.

9. A computer-implemented method comprising:
streaming, respectively by operating a plurality of tiles of a hardware circuit in parallel, data from an upstream input to a downstream destination;
arranging, by an instruction router of the hardware circuit, each task instruction memory of a plurality of task instruction memories in a sequence by coupling to the plurality of tiles to determine a sequence for streaming the data; and
filtering, by the instruction router, requests for instructions to remove duplicate requests.

10. The method of claim 9, wherein each tile comprises a tile access core comprising a prefetch unit.

11. The method of claim 9, wherein each tile comprises a tile execute core comprising a prefetch unit.

12. The method of claim 9, wherein the hardware circuit further comprises an instruction broadcast bus comprising a plurality of data processing lanes, the number of data processing lanes corresponding to the number of task instruction memories.

13. The method of claim 9, wherein the hardware circuit further comprises an instruction request bus comprising a plurality of data processing lanes, the number of data processing lanes corresponding to the number of task instruction memories.

14. The method of claim 9, further comprising providing, by a prefetch unit of the hardware circuit, a request to at least one task instruction memory during a prefetch window.

15. The method of claim 9, further comprising arbitrating, by the instruction router, prefetch read requests via a round robin arbiter.

16. The method of claim 9, further comprising storing, by an instruction buffer of the hardware circuit, instructions for a processing core.

17. A non-transitory computer-readable medium for storing instructions that, when executed by one or more processors, cause the one or more processors to perform operations comprising:
- streaming, respectively by operating a plurality of tiles of a hardware circuit in parallel, data from an upstream input to a downstream destination;
- arranging, by an instruction router of the hardware circuit, each task instruction memory of a plurality of task instruction memories in a sequence by coupling to the plurality of tiles to determine a sequence for streaming the data; and
- filtering, by the instruction router, requests for instructions to remove duplicate requests.

18. The non-transitory computer-readable medium of claim 17, wherein the operations further comprise providing, by a prefetch unit of the hardware circuit, a request to at least one task instruction memory during a prefetch window.

* * * * *